United States Patent
Tong et al.

(10) Patent No.: US 11,294,097 B1
(45) Date of Patent: Apr. 5, 2022

(54) LIGHTNING PREWARNING-BASED METHOD FOR ACTIVE PROTECTION AGAINST LIGHTNING STRIKE ON IMPORTANT TRANSMISSION CHANNEL

(71) Applicant: STATE GRID JIANGSU ELECTRIC POWER CO., LTD. SUZHOU BRANCH, Jiangsu (CN)

(72) Inventors: Chong Tong, Jiangsu (CN); Yunfeng Cai, Jiangsu (CN); Jian Xu, Jiangsu (CN); Jun Wang, Jiangsu (CN); Vang Xu, Jiangsu (CN); Siyang Liao, Jiangsu (CN); Yuetao Wu, Jiangsu (CN); Jianlian Zhang, Jiangsu (CN); Xia Hua, Jiangsu (CN); Liang Wang, Jiangsu (CN); Liudi Fu, Jiangsu (CN); Bowen Wu, Jiangsu (CN)

(73) Assignee: STATE GRID JIANGSU ELECTRIC POWER CO., LTD. SUZHOU BRANCH, Suzhou (CN)

( * ) Notice: Subject to any disclaimer, the term of this patent is extended or adjusted under 35 U.S.C. 154(b) by 0 days.

(21) Appl. No.: 17/522,916

(22) Filed: Nov. 10, 2021

Related U.S. Application Data (63) Continuation of application No. PCT/CN2021/115969, filed on Sep. 1, 2021.

(30) Foreign Application Priority Data

Jan. 29, 2021 (CN) .......................... 202110122071.9

(51) Int. Cl.
*H02H 7/00* (2006.01)
*G01W 1/10* (2006.01)
(Continued)

(52) U.S. Cl.
CPC ............ *G01W 1/10* (2013.01); *H02H 1/0007* (2013.01); *H02H 1/0092* (2013.01); *H02H 7/26* (2013.01)

(58) Field of Classification Search
None
See application file for complete search history.

(56) References Cited

U.S. PATENT DOCUMENTS

| | | | | |
|---|---|---|---|---|
| 5,140,523 A | * | 8/1992 | Frankel | .................. G01W 1/10 340/601 |
| 7,272,516 B2 | * | 9/2007 | Wang | ........................ H02J 3/00 702/60 |

(Continued)

*Primary Examiner* — Stephen W Jackson (57) ABSTRACT

A lightning prewarning-based method for active protection against a lightning strike on an important transmission channel includes collecting meteorological element data, and establishing a transmission line-specific lightning strike probability prewarning model; using a maximum probability of a lightning strike prewarning level as a lightning strike prewarning level; performing equivalence calculation on a large-scale regional power system, using a minimum sum of a power loss risk cost and a regulation cost as an optimized objective function, and establishing a power flow transfer optimization model; and comparing a sum of a regulation cost and load power loss risk cost caused after the tie line is disconnected if regulation is performed before a lightning strike, and a load power loss risk cost caused if regulation is not performed, and when the regulation cost is not greater than the load power loss risk cost, performing regulation before the lightning strike.

10 Claims, 4 Drawing Sheets

(51) Int. Cl.
*H02H 7/26* (2006.01)
*H02H 1/00* (2006.01)

(56) References Cited

U.S. PATENT DOCUMENTS

| | | | | |
|---|---|---|---|---|
| 11,223,395 | B1* | 1/2022 | Marupaduga | H01Q 3/2605 |
| 2008/0077336 | A1* | 3/2008 | Fernandes | H04Q 9/04 |
| | | | | 702/57 |
| 2008/0172312 | A1* | 7/2008 | Synesiou | G06Q 50/06 |
| | | | | 705/34 |
| 2010/0328314 | A1* | 12/2010 | Ellingham | G06Q 30/02 |
| | | | | 345/440 |
| 2012/0286770 | A1* | 11/2012 | Schroder | H05B 47/19 |
| | | | | 324/113 |
| 2015/0198355 | A1* | 7/2015 | Huang | F24D 17/0021 |
| | | | | 126/652 |
| 2019/0305589 | A1* | 10/2019 | Sheng | G06F 30/00 |

* cited by examiner

LIGHTNING PREWARNING-BASED METHOD FOR ACTIVE PROTECTION AGAINST LIGHTNING STRIKE ON IMPORTANT TRANSMISSION CHANNEL

CROSS REFERENCE TO RELATED APPLICATIONS

The present application is a Continuation Application of PCT Application No. PCT/CN2021/115969 filed on Sep. 1, 2021, which claims the benefit of Chinese Patent Application No. 202110122071.9 filed on Jan. 29, 2021. All the above are hereby incorporated by reference in their entirety.

TECHNICAL FIELD

The present disclosure relates to the technical field of lightning protection of transmission lines, and more specifically, to a lightning prewarning-based method for active protection against a lightning strike on an important transmission channel.

BACKGROUND

In the prior art, lightning protection of a transmission channel is realized mainly by improving a lightning resistance capability of a transmission line and reducing a lightning trip-out rate when the line is struck by lightning. Usually, the following measures are taken: reducing tower grounding resistance, improving a lightning withstand level of the transmission line, installing corresponding lightning arresters for multi-circuit lines on a same tower, and the like. Although these traditional static lightning protection measures can reduce lightning damages to a certain extent, most of them focus on reconstruction of the transmission line in a design and installation stage, and the lightning protection measures are often passive.

With the continuous development and extensive interconnection of a power grid, a network structure is becoming more complex. Lightning protection performance of the whole power grid is no longer determined simply by performance of each line or device. Therefore, the traditional lightning protection measures gradually are changed from single static lightning protection to a combination of static lightning protection and dynamic lightning protection. If a transmission line with a large probability of suffering a lightning strike can be predicted before a lightning storm, and appropriate prevention and control measures can be formulated in advance to reduce a power flow on the transmission line, a loss caused by the lightning strike on the transmission line will be greatly reduced.

SUMMARY

To overcome the disadvantages in the prior art, the present disclosure aims to provide a lightning prewarning-based method for active protection against a lightning strike on an important transmission channel, to predict a lightning strike probability of an important transmission channel and determine whether to perform regulation before a lightning strike to reduce a power flow on the important transmission channel and a loss caused by the lightning strike on the line.

The present disclosure adopts the following technical solutions.

A lightning prewarning-based method for active protection against a lightning strike on an important transmission channel includes the following steps:

step 1: collecting meteorological element data, establishing a transmission line-specific lightning strike probability prewarning model based on a Bayesian network, and using, as a lightning strike prewarning level corresponding to a current meteorological element, a prewarning level corresponding to a maximum lightning strike prewarning probability output by the lightning strike probability prewarning model;

step 2: reconstructing a node admittance matrix and calculating equivalent power of a tie line for a large-scale regional power system by using a network equivalence algorithm based on power flow sensitivity;

step 3: using a minimum sum of a power loss risk cost caused after the tie line is disconnected and a regulation cost of outputting power by a generator as an optimized objective function, and establishing, under system constraints, a power flow transfer optimization model of an important transmission channel; and step 4: using, as a regulation cost A, a sum of a power loss risk cost caused after the tie line is actively disconnected when regulation is performed before a lightning strike and the regulation cost of outputting the power by the generator, using, as a load power loss risk cost B, a power loss risk cost caused after the tie line is disconnected due to the lightning strike when no regulation is performed before the lightning strike, and when the regulation cost A is not greater than the load power loss risk cost B, performing regulation before the lightning strike, namely, sending a lightning prewarning and regulating a power flow of the tie line.

Preferably, in step 1, the meteorological element data includes: air temperature, a precipitation, air pressure, a wind direction, a wind speed, and humidity.

In step 1, the transmission line-specific lightning strike probability prewarning model meets the following relationship:

$$P(S_7 | S_1, S_2, S_3, S_4, S_5, S_6) = \frac{P(S_7, S_1, S_2, S_3, S_4, S_5, S_6)}{P(S_1, S_2, S_3, S_4, S_5, S_6)} \quad (1)$$

where in the relationship (1):

$S_1 \sim S_7$ represent discrete statuses of the air temperature, the precipitation, the air pressure, the wind direction, the wind speed, and the humidity, and the lightning strike prewarning level respectively;

$P(S_7, S_1, S_2, S_3, S_4, S_5, S_6)$ represents a joint probability distribution of the meteorological element and the lightning strike prewarning level; and $P(S_7 | S_1, S_2, S_3, S_4, S_5, S_6)$ represents a probability of a lightning strike prewarning level corresponding to a given meteorological element.

Preferably, step 2 includes:

step 2.1: obtaining a power flow of a high-voltage network by performing equivalence on a power flow of a low-voltage network, and reconstructing the node admittance matrix based on an equivalence result, where power flows of the high-voltage network before and after equivalence are the same, and structural equivalence is used for impedance of an alternating current (AC) line, a double-winding transformer, and three-winding transformer; and step 2.2: performing power flow equivalence on power of tie lines of the high-voltage and low-voltage networks based on the power flow sensitivity, and obtaining injected power of a high-voltage node by performing equivalence on injected power of each generator and load node based on influence of the injected power of each generator and load node on power of a tie line of each high-voltage node.

Step 2.1 includes:

step 2.1.1: performing parallel equivalence only for a multi-circuit high-voltage AC line instead of a low-voltage AC line;

step 2.1.2: performing star-type equivalence for the double-winding transformer; adding, based on voltage classes of high-voltage and low-voltage sides of the transformer, an intermediate node for network equivalence; performing equivalence only for a transformer whose voltages at both ends are greater than a specified reference voltage class $V_{ref}$; and skipping performing equivalence for a transformer whose voltage at any end is lower than the specified reference voltage class $V_{ref}$; and step 2.1.3: adding an intermediate node for the three-winding transformer, where impedance of a branch whose voltage is lower than the specified reference voltage class $V_{ref}$ is excluded, but equivalence is performed on a power flow of the branch to obtain injected power of the intermediate node.

Step 2.2 includes:

step 2.2.1: calculating a power flow result of the whole network, and recording a sum $\Sigma P_{Hi,before}$ of the power of the tie line of each high-voltage node and the power of the tine line of the low-voltage network before equivalence;

step 2.2.2: calculating the power flow sensitivity, including: applying a small perturbation $\Delta P_{Lj}$ to injected power of a low-voltage generator and a load node j, recording a sum $\Sigma \Delta P_{Hi}$ of power variation of tie lines between a corresponding high-voltage node i and the low-voltage network, and calculating power flow sensitivity of the high-voltage node i relative to the low-voltage node j based on the following relationship:

$$\alpha_{ij} = \frac{\Sigma \Delta P_{Hi}}{\Delta P_{Lj}} \quad (2)$$

where in the relationship (2):

j=1, ..., n, and n represents a total quantity of low-voltage nodes, and i=1, ..., m, and m represents a total quantity of high-voltage nodes; and step 2.2.3: calculating equivalent injected power, including: after obtaining power flow sensitivity of each high-voltage node relative to each low-voltage node, using, as equivalent injected power of the high-voltage node i, a sum of injected power that is of the high-voltage node i and obtained by performing equivalence on the injected power of each generator and load node based on corresponding power flow sensitivity, where the following relationship is met:

$$P_{Hi} = \sum_{j=1}^{n} \alpha_{ij} P_{Lj} \quad (3)$$

where in the relationship (3):

$P_{Hi}$ represents the equivalent injected power of the high-voltage node i after equivalence based on the power flow sensitivity, and $P_{Lj}$ represents the injected power of the low-voltage generator and the load node j.

Preferably, step 3 includes:

step 3.1: using a minimum sum of a power loss risk cost caused after an inter-province tie line is disconnected and a regulation cost of outputting power by a generation set as an optimized objective based on a lightning strike probability of the important transmission channel, to establish the optimized objective function based on the following relationship:

$$F = \min \left\{ \sum_{k=1}^{N_G} \left( a_k P_{G,k}^2 + b_k P_{G,k} + c_k \right) + w_l P_{line} \right\} \quad (4)$$

where in the relationship (4):

$N_G$ represents a quantity of conventional sets directly regulated in a power grid, $P_{G,k}$ represents power output by a conventional set k, $a_k$, $b_k$, $c_k$ represent cost coefficients related to characteristics of the conventional set k, $P_{line}$ represents active power transmitted by the tie line on the important transmission channel in the power grid, and $w_l$ represents a per-unit power loss risk cost caused after the corresponding tie line is disconnected;

step 3.2: establishing the system constraints, including: a power flow constraint, a power balance constraint, a constraint on a creep speed of a conventional set, a constraint on upper and lower power flow limits of a branch, and a constraint on upper and lower limits of power output by the conventional set; and step 3.3: establishing the power flow transfer optimization model of the important transmission channel by using the optimized objective function under the system constraints.

Step 3.2 includes:

step 3.2.1: establishing a direct current (DC) power flow constraint based on the following relationship:

$$P^{sp} = B_0 \theta \quad (5)$$

where in the relationship (5):

$P^{sp}$ represents a column vector of injected power of a node excluding a balance node, $B_0$ represents a node admittance matrix ignoring resistance of the branch, and $\theta$ represents a column vector of a voltage phase angle of the node;

step 3.2.2: establishing the power balance constraint based on the following relationship:

$$\sum_{i=1}^{N_G} P_{G,k} - \sum_{j=1}^{N_L} P_{L,j} = 0 \quad (6)$$

where in the relationship (6):

$P_{L,j}$ represents the active power of the load node j, and $N_L$ represents a quantity of load nodes j;

step 3.2.3: establishing the constraint on a creep speed of a conventional set based on time ahead of the lightning prewarning and the following relationship:

$$\begin{cases} P_{G,k}^{after} - P_{G,k}^{before} \leq U_{G,k} \Delta t \\ P_{G,k}^{before} - P_{G,k}^{after} \leq D_{G,k} \Delta t \end{cases} \quad (7)$$

where in the relationship (7):

$P_{G,k}^{before}$ and $P_{G,k}^{after}$ respectively represent active power output by the conventional set k before and after regulation is performed before the lightning strike, $U_{G,k}$ and $D_{G,k}$ respectively represent maximum upward and downward creep power of the conventional set k within unit time, and Δt represents the time ahead of the lightning prewarning;

step 3.2.4: establishing the constraint on upper and lower power flow limits of a branch based on the following relationship:

$$P_{ij,min} \leq P_{ij} \leq P_{ij,max} \qquad (8)$$

where in the relationship (8):

$P_{ij}$ represents an active power flow of a branch ij, and $P_{ij,min}$ and $P_{ij,max}$ respectively represent limit values of the active power flow transmitted by the branch ij; and step 3.2.5: establishing, based on the following relationship, the constraint on upper and lower limits of power output by the conventional set:

$$P_{G,k,min} \leq P_{G,k} \leq P_{G,k,max} \qquad (9)$$

where in the relationship (9):

$P_{G,k,min}$ and $P_{G,k,max}$ respectively represent lower and upper limits of power output by the conventional set k when active lightning strike prevention and control measures are taken.

Preferably, in step 4, the regulation cost A meets the following relationship:

$$A = \sum_{k=1}^{N_G} (a_k P_{G,k}^2 + b_k P_{G,k} + c_k) + w_l P_{line,after}; \qquad (10)$$

and the load power loss risk cost B meets the following relationship:

$$B = w_l P_{line,before} \qquad (11)$$

where in the above relationship:

$N_G$ represents a quantity of conventional sets directly regulated in a power grid, $P_{G,k}$ represents power output by a conventional set k, $a_k$, $b_k$, $c_k$ represent cost coefficients related to characteristics of the conventional set k, $P_{line,after}$ represents active power transmitted by the tie line on the important transmission channel in the power grid after regulation is performed before the lightning strike, $P_{line,before}$ represents active power transmitted by the tie line on the important transmission channel in the power grid before regulation is performed before the lightning strike, and $w_l$ represents a per-unit power loss risk cost caused after the corresponding tie line is disconnected.

In step 4, the load power loss risk cost B includes a load power loss risk cost calculated based on a flexible load regulation capability.

The present disclosure has the following beneficial effects: Compared with the prior art, an appropriate strategy for protection against a lightning strike is made based on a lightning prewarning, to provide reasonable guidance for dispatchers, achieve active lightning protection, and especially when a high lightning strike risk is predicted for an inter-province tie line on an important transmission channel, perform regulation before the lightning strike. This not only achieves lightning strike prewarning, but also can reduce a load loss and a regulation cost caused by the lightning strike.

DETAILED DESCRIPTION

The prevent disclosure is further described below with reference to the accompanying drawings. The following embodiments are only used for describing the technical solutions of the present disclosure more clearly, and are not intended to limit the protection scope of the present disclosure.

Figure 1:
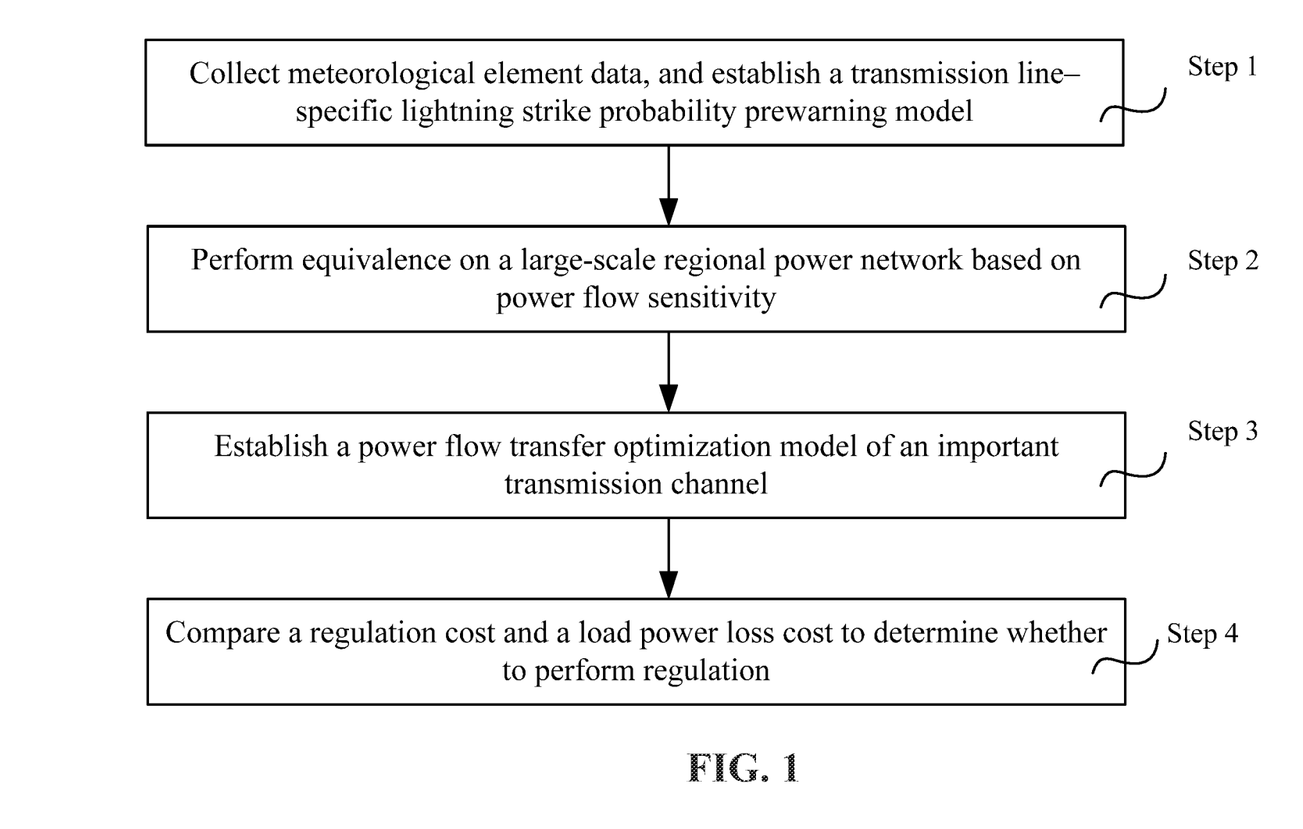
FIG. 1 is a flowchart of a lightning prewarning-based method for active protection against a lightning strike on an important transmission channel according to the present disclosure.
Figure 2:
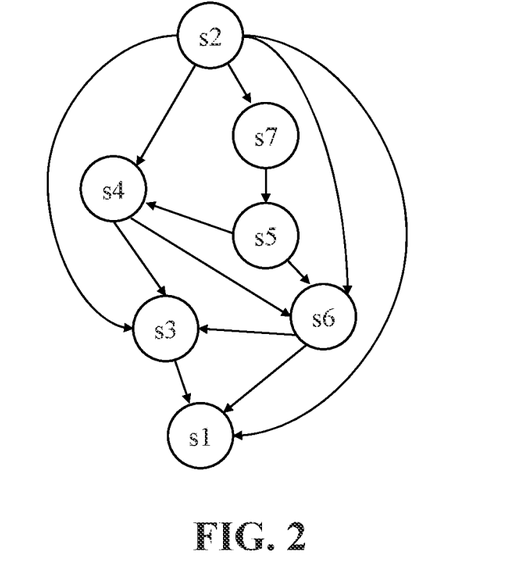
FIG. 2 is a schematic structural diagram of establishing a transmission line-specific lightning strike probability prewarning model based on a Bayesian network in a lightning prewarning-based method for active protection against a lightning strike on an important transmission channel according to the present disclosure.

As shown in FIG. 1, a lightning prewarning-based method for active protection against a lightning strike on an important transmission channel includes the following steps:

Step 1: Collect meteorological element data, establish a transmission line-specific lightning strike probability prewarning model based on a Bayesian network, and use, as a lightning strike prewarning level corresponding to a current meteorological element, a lightning strike prewarning level corresponding to a maximum lightning strike prewarning probability output by the lightning strike probability prewarning model.

Specifically, in step 1, the meteorological element data includes: air temperature, a precipitation, air pressure, a wind direction, a wind speed, and humidity.

In a preferred embodiment of the present disclosure, the six meteorological elements, namely, the air temperature, the precipitation, the air pressure, the wind direction, the wind speed, and the humidity, as well as the lightning strike prewarning level are selected as random variables to establish the Bayesian network that depicts a correlation between the seven random variables, as shown in FIG. 1. When data of the six meteorological elements at a next time point is obtained, corresponding statuses can be obtained for the six meteorological elements based on respective discrete intervals of the six meteorological elements, so that a probability of each lightning strike prewarning level corresponding to the meteorological status can be obtained based on the constructed Bayesian network.

In step 1, the transmission line-specific lightning strike probability prewarning model meets the following relationship:

$$P(S_7 \mid S_1, S_2, S_3, S_4, S_5, S_6) = \frac{P(S_7, S_1, S_2, S_3, S_4, S_5, S_6)}{P(S_1, S_2, S_3, S_4, S_5, S_6)} \quad (1)$$

where in the relationship (1):

$S_1 \sim S_7$ represent the discrete statuses of the air temperature, the precipitation, the air pressure, the wind direction, the wind speed, and the humidity, and the lightning strike prewarning level respectively, in other words, S1 to S6 represent the discrete statuses of the air temperature, the precipitation, the air pressure, the wind direction, the wind speed, and the humidity respectively, and S7 represents the lightning strike prewarning level;

$P(S_7, S_1, S_2, S_3, S_4, S_5, S_6)$ represents a joint probability distribution of the meteorological element and the lightning strike prewarning level; and $P(S_7 \mid S_1, S_2, S_3, S_4, S_5, S_6)$ represents a probability of a lightning strike prewarning level corresponding to a given meteorological element.

Step 2: Reconstruct a node admittance matrix and calculate equivalent power of a tie line for a large-scale regional power system by using a network equivalence algorithm based on power flow sensitivity.

Specifically, step 2 includes the following steps:

Step 2.1: Obtain a power flow of a high-voltage network by performing equivalence on a power flow of a low-voltage network, and reconstruct the node admittance matrix based on an equivalence result, where power flows of the high-voltage network before and after equivalence are the same, and structural equivalence is used for impedance of an AC line, a double-winding transformer, and three-winding transformer.

Step 2.1 includes the following steps:

Step 2.1.1: Perform parallel equivalence only for a multi-circuit high-voltage AC line instead of a low-voltage AC line.

Figure 3:
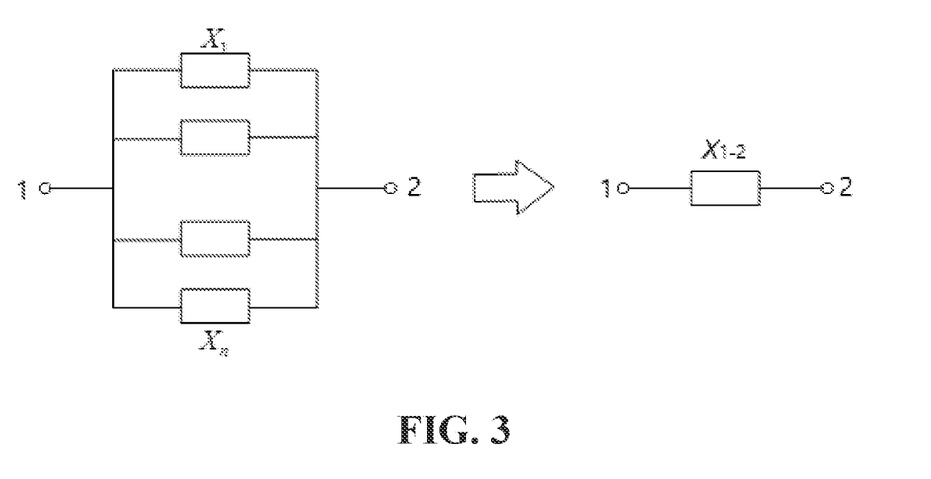
FIG. 3 is a schematic diagram of performing equivalence on an AC line by using a network equivalence algorithm based on power flow sensitivity in a lightning prewarning-based method for active protection against a lightning strike on an important transmission channel according to the present disclosure.

As shown in FIG. 3, there are a plurality of high-voltage AC lines between a terminal 1 and a terminal 2, and their impedance is $X_1, \ldots, X_n$ in turn. After parallel equivalence is performed on their impedance, equivalent impedance of the AC lines between the terminal 1 and the terminal 2 is $X_{1\text{-}2}$.

Step 2.1.2: Perform star-type equivalence for the double-winding transformer; add, based on voltage classes of high-voltage and low-voltage sides of the transformer, an intermediate node for network equivalence; perform equivalence only for a transformer whose voltages at both ends are greater than a specified reference voltage class $V_{ref}$; and skip performing equivalence for a transformer whose voltage at any end is lower than the specified reference voltage class $V_{ref}$.

Figure 4:
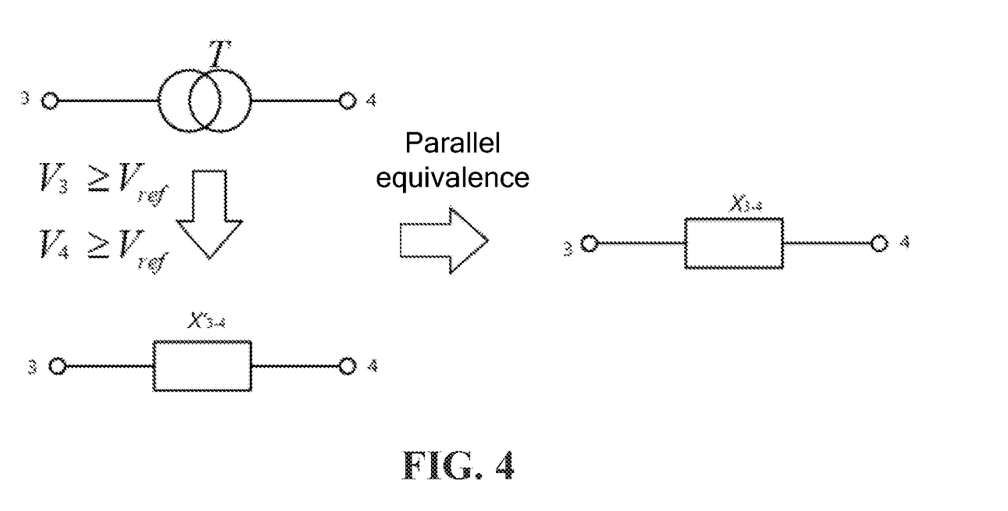
FIG. 4 is a schematic diagram of performing equivalence on a double-winding transformer by using a network equivalence algorithm based on power flow sensitivity in a lightning prewarning-based method for active protection against a lightning strike on an important transmission channel according to the present disclosure.

As shown in FIG. 4, the double-winding transformer T has two terminals 3 and 4, $V_3 \geq V_{ref}$ and $V_4 \geq V_{ref}$. In this case, star-type equivalence is performed on the double-winding transformer. Then, equivalent impedance, of the double-winding transformer T, between the terminals 3 and 4 is obtained, namely, $X_{3\text{-}4}'$. After that, parallel equivalence is performed on the equivalent impedance, of the double winding transformer T, between the terminals 3 and 4 to obtain $X_{3\text{-}4}$.

Step 2.1.3: Add an intermediate node for the three-winding transformer, where impedance of a branch whose voltage is lower than the specified reference voltage class $V_{ref}$ is excluded, but equivalence is performed on a power flow of the branch to obtain injected power of the intermediate node.

Figure 5:
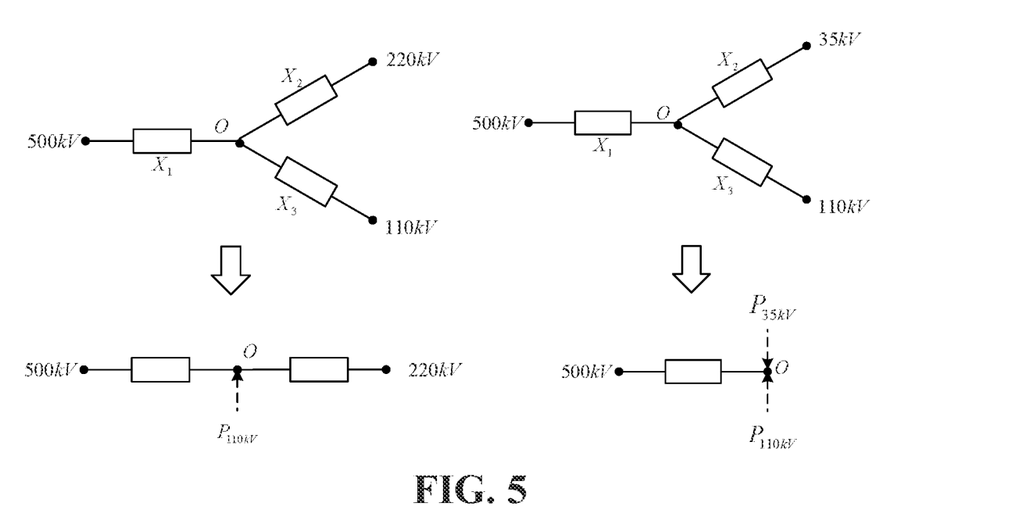
FIG. 5 is a schematic diagram of performing equivalence on a three-winding transformer by using a network equivalence algorithm based on power flow sensitivity in a lightning prewarning-based method for active protection against a lightning strike on an important transmission channel according to the present disclosure.

As shown in FIG. 5, for a 500 kV/220 kV/110 kV three-winding transformer, an intermediate node 0 is first added, impedance of a 500 kV branch to the intermediate node 0 is $X_1$, impedance of a 220 kV branch to the intermediate node 0 is $X_2$, and impedance of a 110 kV branch to the intermediate node 0 is $X_3$. When $V_{ref}=220$ kV, the impedance of the 110 kV branch is excluded, but equivalence is performed on a power flow of the 110 kV branch to obtain injected power $P_{110\ kV}$ of the intermediate node.

As shown in FIG. 5, for a 500 kV/110 kV/35 kV three-winding transformer, an intermediate node 0 is first added, impedance of a 500 kV branch to the intermediate node 0 is $X_1$, impedance of a 110 kV branch to the intermediate node 0 is $X_2$, and impedance of a 35 kV branch to the intermediate node 0 is $X_3$. When $V_{ref}=220$ kV, the impedance of the 110 kV branch and the 35 kV branch is excluded, but equivalence is performed power flows of the 110 kV branch and the 35 kV branch to obtain injected power $P_{110\ kV}$ and $P_{35\ kV}$ of the intermediate node respectively.

Step 2.2: Perform power flow equivalence on power of tie lines of the high-voltage and low-voltage networks based on the power flow sensitivity, and obtain injected power of a high-voltage node by performing equivalence on injected power of each generator and load node based on influence of the injected power of each generator and load node on power of a tie line of each high-voltage node.

Figure 6:
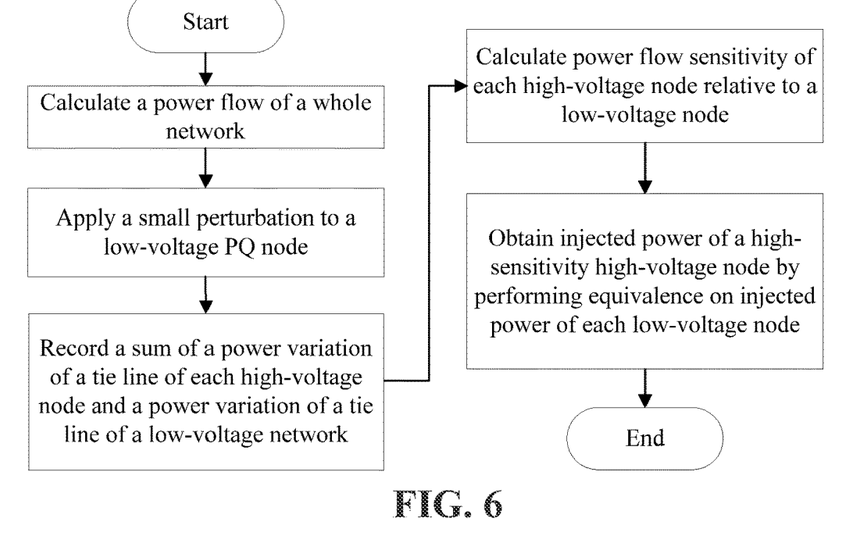
FIG. 6 is a flowchart of performing equivalence on power of a tie line by using a network equivalence algorithm based on power flow sensitivity in a lightning prewarning-based method for active protection against a lightning strike on an important transmission channel according to the present disclosure.

As shown in FIG. 6, step 2.2 includes the following steps:

Step 2.2.1: Calculate a power flow result of the whole network, and record a sum $\Sigma P_{Hi,before}$ of the power of the tie line of each high-voltage node and the power of the tine line of the low-voltage network before equivalence.

Step 2.2.2: Calculate the power flow sensitivity. Specifically, apply a small perturbation $\Delta P_{Lj}$ to injected power of a low-voltage generator and a load node j, record a sum $\Sigma \Delta P_{Hi}$ of power variations of tie lines a corresponding high-voltage node i and the low-voltage network, and calculate power flow sensitivity of the high-voltage node i relative to the low-voltage node j based on the following relationship:

$$\alpha_{i,j} = \frac{\Sigma \Delta P_{Hi}}{\Delta P_{Lj}} \quad (2)$$

where in the relationship (2):

j=1, . . . , n, and n represents a total quantity of low-voltage nodes, and i=1, . . . , m, and m represents a total quantity of high-voltage nodes.

Step 2.2.3: Calculate equivalent injected power. After obtaining power flow sensitivity of each high-voltage node relative to each low-voltage node, use, as equivalent injected power of the high-voltage node i, a sum of injected power that is of the high-voltage node i and obtained by performing equivalence on the injected power of each generator and load node based on corresponding power flow sensitivity, where the following relationship is met:

$$P_{Hi} = \sum_{j=1}^{n} \alpha_{ij} P_{Lj} \qquad (3)$$

where in the relationship (3):

$P_{Hi}$ represents the equivalent injected power of the high-voltage node i after equivalence based on the power flow sensitivity, and $P_{Lj}$ represents the injected power of the low-voltage generator and the load node j.

In a preferred embodiment of the present disclosure, the large-scale power system is analyzed and calculated by using the network equivalence method based on the power flow sensitivity to improve a calculation speed. A power calculation speed of an important transmission channel, especially a power calculation speed of the tie line, can meet a decision-making time requirement for prevention and control measures before a lightning strike.

Step 3: Use a minimum sum of a power loss risk cost caused after the tie line is disconnected and a regulation cost of outputting power by a generator as an optimized objective function, and establish, under system constraints, a power flow transfer optimization model of the important transmission channel.

Preferably, step 3 includes the following steps:

Step 3.1: Use a minimum sum of a power loss risk cost caused after an inter-province tie line is disconnected and a regulation cost of outputting power by a generation set as an optimized objective based on a lightning strike probability of the important transmission channel, to establish the optimized objective function based on the following relationship:

$$F = \min\left(\sum_{k=1}^{N_G} (a_k P_{G,k}^2 + b_k P_{G,k} + c_k) + w_l P_{line}\right) \qquad (4)$$

where in the relationship (4):

$N_G$ represents a quantity of conventional sets directly regulated in a power grid, $P_{G,k}$ represents power output by a conventional set k, $a_k$, $b_k$, $c_k$ represent cost coefficients related to characteristics of the conventional set k, $P_{line}$ represents active power transmitted by the tie line on the important transmission channel in the power grid, and $w_l$ represents a per-unit power loss risk cost caused after the corresponding tie line is disconnected;

Step 3.2: Establish the system constraints, including a power flow constraint, a power balance constraint, a constraint on a creep speed of a conventional set, a constraint on upper and lower power flow limits of a branch, and a constraint on upper and lower limits of power output by the conventional set.

Step 3.3: Establish the power flow transfer optimization model of the important transmission channel by using the optimized objective function under the system constraints.

Step 3.2 includes the following steps:

Step 3.2.1: Establish a DC power flow constraint based on the following relationship:

$$P^{sp} = B_0 \theta \qquad (5)$$

where in the relationship (5):

$P^{sp}$ represents a column vector of injected power of a node excluding a balance node, $B_0$ represents a node admittance matrix ignoring resistance of the branch, and θ represents a column vector of a voltage phase angle of the node.

Step 3.2.2: Establish the power balance constraint based on the following relationship:

$$\sum_{i=1}^{N_G} P_{G,k} - \sum_{j=1}^{N_L} P_{L,j} = 0 \qquad (6)$$

where in the relationship (6):

$P_{L,j}$ represents the active power of the load node j, and $N_L$ represents a quantity of load nodes j.

Step 3.2.3: Establish the constraint on a creep speed of a conventional set based on time ahead of the lightning prewarning and the following relationship:

$$\begin{cases} P_{G,k}^{after} - P_{G,k}^{before} \leq U_{G,k} \Delta t \\ P_{G,k}^{before} - P_{G,k}^{after} \leq D_{G,k} \Delta t \end{cases} \qquad (7)$$

where in the relationship (7):

$P_{G,k}^{before}$ and $P_{G,k}^{after}$ respectively represent active power output by the conventional set k before and after regulation is performed before the lightning strike, $U_{G,k}$ and $D_{G,k}$ respectively represent maximum upward and downward creep power of the conventional set k within unit time, and $\Delta t$ represents the time ahead of the lightning prewarning.

Step 3.2.4: Establish the constraint on upper and lower power flow limits of a branch based on the following relationship:

$$P_{ij,min} \leq P_{ij} \leq P_{ij,max} \qquad (8)$$

where in the relationship (8):

$P_{ij}$ represents an active power flow of a branch ij, and $P_{ij,min}$ and $P_{ij,max}$ respectively represent limit values of the active power flow transmitted by the branch ij.

Step 3.2.5: Establish, based on the following relationship, the constraint on upper and lower limits of power output by the conventional set:

$$P_{G,k,min} \leq P_{G,k} \leq P_{G,k,max} \qquad (9)$$

where in the relationship (9):

$P_{G,k,min}$ and $P_{G,k,max}$ respectively represent lower and upper limits of power output by the conventional set k when active lightning strike prevention and control measures are taken.

Figure 7:
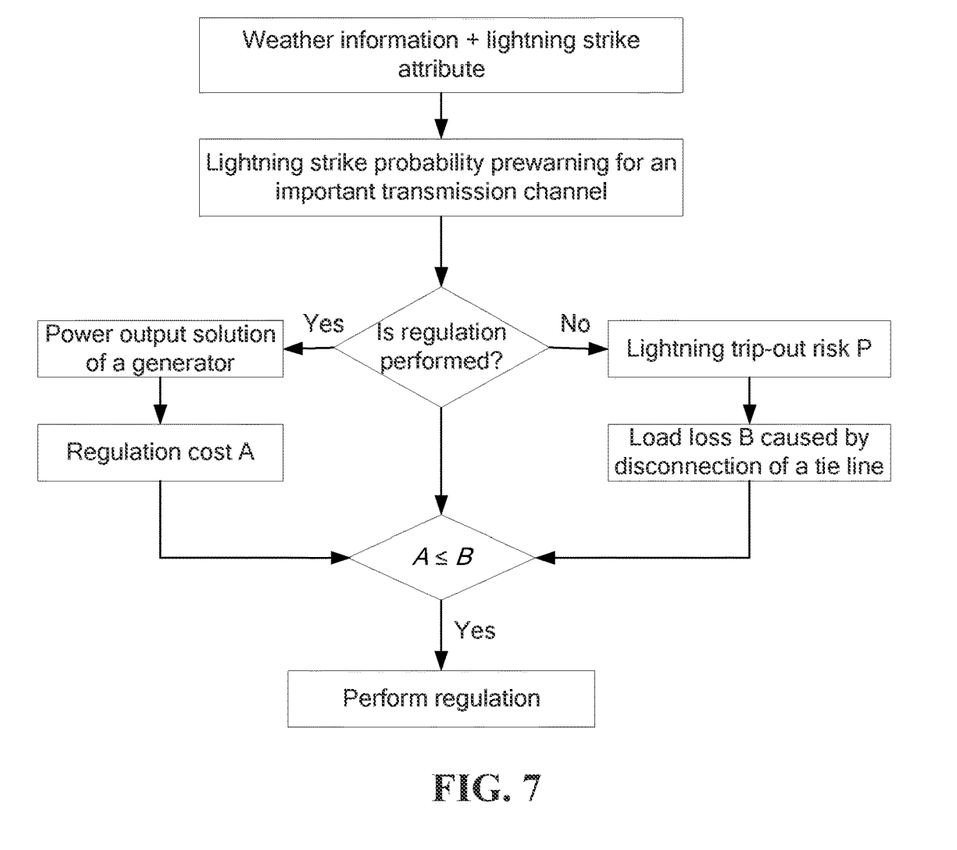
FIG. 7 is a flowchart of implementing a strategy for active protection against a lightning strike in a lightning prewarning-based method for active protection against a lightning strike on an important transmission channel according to the present disclosure.

Step 4: Use, as a regulation cost A, a sum of a power loss risk cost caused after the tie line is actively disconnected when regulation is performed before the lightning strike and the regulation cost of outputting the power by the generator, use, as a load power loss risk cost B, a power loss risk cost caused after the tie line is disconnected due to the lightning strike when no regulation is performed before the lightning strike, and as shown in FIG. 7, when the regulation cost A is not greater than the load power loss risk cost B, perform regulation is performed before the lightning strike, namely, send a lightning prewarning and regulating a power flow of the tie line.

Specifically, in step 4, the regulation cost A meets the following relationship:

$$A = \sum_{k=1}^{N_G} (a_k P_{G,k}^2 + b_k P_{G,k} + c_k) + w_l P_{line,after}; \quad (10)$$

and the load power loss risk cost B meets the following relationship:

$$B = w_l P_{line,before} \quad (11)$$

where in the above relationship:

$N_G$ represents a quantity of conventional sets directly regulated in a power grid, $P_{G,k}$ represents power output by a conventional set k, $a_k$, $b_k$, $c_k$ represent cost coefficients related to characteristics of the conventional set k, $P_{line,after}$ represents active power transmitted by the tie line on the important transmission channel in the power grid after regulation is performed before the lightning strike, $P_{line,before}$ represents active power transmitted by the tie line on the important transmission channel in the power grid before regulation is performed before the lightning strike, and $w_l$ represents a per-unit power loss risk cost caused after the corresponding tie line is disconnected.

In step 4, the load power loss risk cost B includes a load power loss risk cost calculated based on a flexible load regulation capability.

The present disclosure has the following beneficial effects: Compared with the prior art, an appropriate strategy for protection against a lightning strike is made based on a lightning prewarning, to provide reasonable guidance for dispatchers, achieve active lightning protection, and especially when a high lightning strike risk is predicted for an inter-province tie line on an important transmission channel, perform regulation before the lightning strike. This not only achieves lightning strike prewarning, but also can reduce a load loss and a regulation cost caused by the lightning strike.

The applicant of the present disclosure has made a detailed description of the implementation examples of the present disclosure with reference to the accompanying drawings in the present disclosure. However, those skilled in the art should understand that the above implementation examples are only preferred implementation solutions of the present disclosure, and the detailed description is only to help readers better understand the spirit of the present disclosure, rather than to limit the protection scope of the present disclosure. On the contrary, any improvement or modification based on the spirit of the present disclosure shall fall within the protection scope of the present disclosure.

The invention claimed is:

1. A lightning prewarning-based method for active protection against a lightning strike on an important transmission channel, wherein the method comprises the following steps:

step 1: collecting meteorological element data, establishing a transmission line-specific lightning strike probability prewarning model based on a Bayesian network, and using, as a lightning strike prewarning level corresponding to a current meteorological element, a prewarning level corresponding to a maximum lightning strike prewarning probability output by the lightning strike probability prewarning model;

step 2: reconstructing a node admittance matrix and calculating equivalent power of a tie line for a large-scale regional power system by using a network equivalence algorithm based on power flow sensitivity;

step 3: using a minimum sum of a power loss risk cost caused after the tie line is disconnected and a regulation cost of outputting power by a generator as an optimized objective function, and establishing, under system constraints, a power flow transfer optimization model of an important transmission channel; and step 4: using, as a regulation cost A, a sum of a power loss risk cost caused after the tie line is actively disconnected when regulation is performed before a lightning strike and the regulation cost of outputting the power by the generator, using, as a load power loss risk cost B, a power loss risk cost caused after the tie line is disconnected due to the lightning strike when no regulation is performed before the lightning strike, and when the regulation cost A is not greater than the load power loss risk cost B, performing regulation before the lightning strike, namely, sending a lightning prewarning and regulating a power flow of the tie line.

2. The lightning prewarning-based method for active protection against a lightning strike on an important transmission channel according to claim 1, wherein in step 1, the meteorological element data comprises: air temperature, a precipitation, air pressure, a wind direction, a wind speed, and humidity.

3. The lightning prewarning-based method for active protection against a lightning strike on an important transmission channel according to claim 2, wherein in step 1, the transmission line-specific lightning strike probability prewarning model meets the following relationship:

$$P(S_7 \mid S_1, S_2, S_3, S_4, S_5, S_6) = \frac{P(S_7, S_1, S_2, S_3, S_4, S_5, S_6)}{P(S_1, S_2, S_3, S_4, S_5, S_6)} \quad (1)$$

wherein in the relationship (1), $S_1 \sim S_7$ represent discrete statuses of the air temperature, the precipitation, the air pressure, the wind direction, the wind speed, and the humidity, and the lightning strike prewarning level respectively;

$P(S_7, S_1, S_2, S_3, S_4, S_5, S_6)$ represents a joint probability distribution of the meteorological element and the lightning strike prewarning level; and $P(S_7|S_1, S_2, S_3, S_4, S_5, S_6)$ represents a probability of a lightning strike prewarning level corresponding to a given meteorological element.

4. The lightning prewarning-based method for active protection against a lightning strike on an important transmission channel according to claim 1, wherein step 2 comprises:
- step 2.1: obtaining a power flow of a high-voltage network by performing equivalence on a power flow of a low-voltage network, such that power flows of the high-voltage network before and after equivalence are the same; wherein structural equivalence is used for impedance of an alternating current (AC) line, a double-winding transformer, and three-winding transformer; and reconstructing the node admittance matrix based on an equivalence result; and
- step 2.2: performing power flow equivalence on power of tie lines of the high-voltage and low-voltage networks based on the power flow sensitivity, and obtaining injected power of a high-voltage node by performing equivalence on injected power of each generator and load node based on influence of the injected power of each generator and load node on power of a tie line of each high-voltage node.

5. The lightning prewarning-based method for active protection against a lightning strike on an important transmission channel according to claim 4, wherein
step 2.1 comprises:
- step 2.1.1: performing parallel equivalence only for a multi-circuit high-voltage AC line instead of a low-voltage AC line;
- step 2.1.2: performing star-type equivalence for the double-winding transformer; adding, based on voltage classes of high-voltage and low-voltage sides of the transformer, an intermediate node for network equivalence; performing equivalence only for a transformer whose voltages at both ends are greater than a specified reference voltage class $V_{ref}$; and skipping performing equivalence for a transformer whose voltage at any end is lower than the specified reference voltage class $V_{ref}$; and
- step 2.1.3: adding an intermediate node for the three-winding transformer, wherein impedance of a branch whose voltage is lower than the specified reference voltage class $V_{ref}$ is excluded, but equivalence is performed on a power flow of the branch to obtain injected power of the intermediate node.

6. The lightning prewarning-based method for active protection against a lightning strike on an important transmission channel according to claim 4, wherein
step 2.2 comprises:
- step 2.2.1: calculating a power flow result of the whole network, and recording a sum $\Sigma P_{Hi,before}$ of the power of the tie line of each high-voltage node and the power of the tine line of the low-voltage network before equivalence;
- step 2.2.2: calculating the power flow sensitivity, comprising: applying a small perturbation $\Delta P_{Lj}$ to injected power of a low-voltage generator and a load node j, recording a sum $\Sigma \Delta P_{Hi}$ of power variations of tie lines between corresponding high-voltage node i and the low-voltage network, and calculating power flow sensitivity of the high-voltage node i relative to the low-voltage node j based on the following relationship:

$$\alpha_{ij} = \frac{\Sigma \Delta P_{Hi}}{\Delta P_{Lj}} \quad (2)$$

wherein in the relationship (2):
j=1, ..., n, and n represents a total quantity of low-voltage nodes, and i=1, ..., m, and m represents a total quantity of high-voltage nodes; and
- step 2.2.3: calculating equivalent injected power, comprising: after obtaining power flow sensitivity of each high-voltage node relative to each low-voltage node, using, as equivalent injected power of the high-voltage node i, a sum of injected power that is of the high-voltage node i and obtained by performing equivalence on the injected power of each generator and load node based on corresponding power flow sensitivity, wherein the following relationship is met:

$$P_{Hi} = \sum_{j=1}^{n} \alpha_{ij} P_{Lj} \quad (3)$$

wherein in the relationship (3):
- $P_{Hi}$ represents the equivalent injected power of the high-voltage node i after equivalence based on the power flow sensitivity, and
- $P_{Lj}$ represents the injected power of the low-voltage generator and the load node j.

7. The lightning prewarning-based method for active protection against a lightning strike on an important transmission channel according to claim 1, wherein
step 3 comprises:
- step 3.1: using a minimum sum of a power loss risk cost caused after an inter-province tie line is disconnected and a regulation cost of outputting power by a generation set as an optimized objective based on a lightning strike probability of the important transmission channel, to establish the optimized objective function based on the following relationship:

$$F = \min\left(\sum_{k=1}^{N_G} (a_k P_{G,k}^2 + b_k P_{G,k} + c_k) + w_l P_{line}\right) \quad (4)$$

wherein in the relationship (4):
- $N_G$ represents a quantity of conventional sets directly regulated in a power grid,
- $P_{G,k}$ represents power output by a conventional set k,
- $a_k$, $b_k$, $c_k$ represent cost coefficients related to characteristics of the conventional set k,
- $P_{line}$ represents active power transmitted by the tie line on the important transmission channel in the power grid, and
- $w_l$ represents a per-unit power loss risk cost caused after the corresponding tie line is disconnected;
- step 3.2: establishing the system constraints, comprising a power flow constraint, a power balance constraint, a constraint on a creep speed of a conventional set, a constraint on upper and lower power flow limits of a branch, and a constraint on upper and lower limits of power output by the conventional set;
- step 3.3: establishing the power flow transfer optimization model of the important transmission channel by using the optimized objective function under the system constraints.

8. The lightning prewarning-based method for active protection against a lightning strike on an important transmission channel according to claim 7, wherein step 3.2 comprises:

step 3.2.1: establishing a direct current (DC) power flow constraint based on the following relationship:

$$P^{sp} = B_0 \theta \qquad (5)$$

wherein in the relationship (5):

$P^{sp}$ represents a column vector of injected power of a node excluding a balance node, $B_0$ represents a node admittance matrix ignoring resistance of the branch, and $\theta$ represents a column vector of a voltage phase angle of the node;

step 3.2.2: establishing the power balance constraint based on the following relationship:

$$\sum_{i=1}^{N_G} P_{G,k} - \sum_{j=1}^{N_L} P_{L,j} = 0 \qquad (6)$$

wherein in the relationship (6):

$P_{L,j}$ represents the active power of the load node j, and $N_L$ represents a quantity of load nodes j;

step 3.2.3: establishing the constraint on a creep speed of a conventional set based on time ahead of the lightning prewarning and the following relationship:

$$\begin{cases} P_{G,k}^{after} - P_{G,k}^{before} \le U_{G,k} \Delta t \\ P_{G,k}^{before} - P_{G,k}^{after} \le D_{G,k} \Delta t \end{cases} \qquad (7)$$

wherein in the relationship (7):

$P_{G,k}^{before}$ and $P_{G,k}^{after}$ respectively represent active power output by the conventional set k before and after regulation is performed before the lightning strike, $U_{G,k}$ and $D_{G,k}$ respectively represent maximum upward and downward creep power of the conventional set k within unit time, and $\Delta t$ represents the time ahead of the lightning prewarning;

step 3.2.4: establishing the constraint on upper and lower power flow limits of a branch based on the following relationship:

$$P_{ij,min} \le P_{ij} \le P_{ij,max} \qquad (8)$$

wherein in the relationship (8):

$P_{ij}$ represents an active power flow of a branch ij, and $P_{ij,min}$ and $P_{ij,max}$ respectively represent limit values of the active power flow transmitted by the branch ij; and step 3.2.5: establishing, based on the following relationship, the constraint on upper and lower limits of power output by the conventional set:

$$P_{G,k,min} \le P_{G,k} \le P_{G,k,max} \qquad (9)$$

wherein in the relationship (9):

$P_{G,k,min}$ and $P_{G,k,max}$ respectively represent lower and upper limits of power output by the conventional set k when active lightning strike prevention and control measures are taken.

9. The lightning prewarning-based method for active protection against a lightning strike on an important transmission channel according to claim 1, wherein
in step 4, the regulation cost A meets the following relationship:

$$A = \sum_{k=1}^{N_G} (a_k P_{G,k}^2 + b_k P_{G,k} + c_k) + w_l P_{line,after}; \qquad (10)$$

and
the load power loss risk cost B meets the following relationship:

$$B = w_l P_{line,before} \qquad (11)$$

wherein in the above relationships:

$N_G$ represents a quantity of conventional sets directly regulated in a power grid, $P_{G,k}$ represents power output by a conventional set k, $a_k$, $b_k$, $c_k$ represent cost coefficients related to characteristics of the conventional set k, $P_{line,after}$ represents active power transmitted by the tie line on the important transmission channel in the power grid after regulation is performed before the lightning strike, $P_{line,before}$ represents active power transmitted by the tie line on the important transmission channel in the power grid before regulation is performed before the lightning strike, and $w_l$ represents a per-unit power loss risk cost caused after the corresponding tie line is disconnected.

10. The lightning prewarning-based method for active protection against a lightning strike on an important transmission channel according to claim 9, wherein
in step 4, the load power loss risk cost B comprises a load power loss risk cost calculated based on a flexible load regulation capability.

* * * * *

UNITED STATES PATENT AND TRADEMARK OFFICE
CERTIFICATE OF CORRECTION

PATENT NO. : 11,294,097 B1  
APPLICATION NO. : 17/522916  
DATED : April 5, 2022  
INVENTOR(S) : Chong Tong et al.

Page 1 of 1

It is certified that error appears in the above-identified patent and that said Letters Patent is hereby corrected as shown below:

On the Title Page

In Item (72) Inventors, the correct data of the 5th inventor should be "Yang Xu, Jiangsu (CN)".

Signed and Sealed this  
Twentieth Day of September, 2022

Katherine Kelly Vidal  
*Director of the United States Patent and Trademark Office*